G. MARSHALL.
MACHINE FOR MAKING SHOCKS.
APPLICATION FILED NOV. 24, 1915.

1,176,585.

Patented Mar. 21, 1916.
5 SHEETS—SHEET 2.

Inventor
George Marshall.
By his Attorneys
Baldwin & Wight

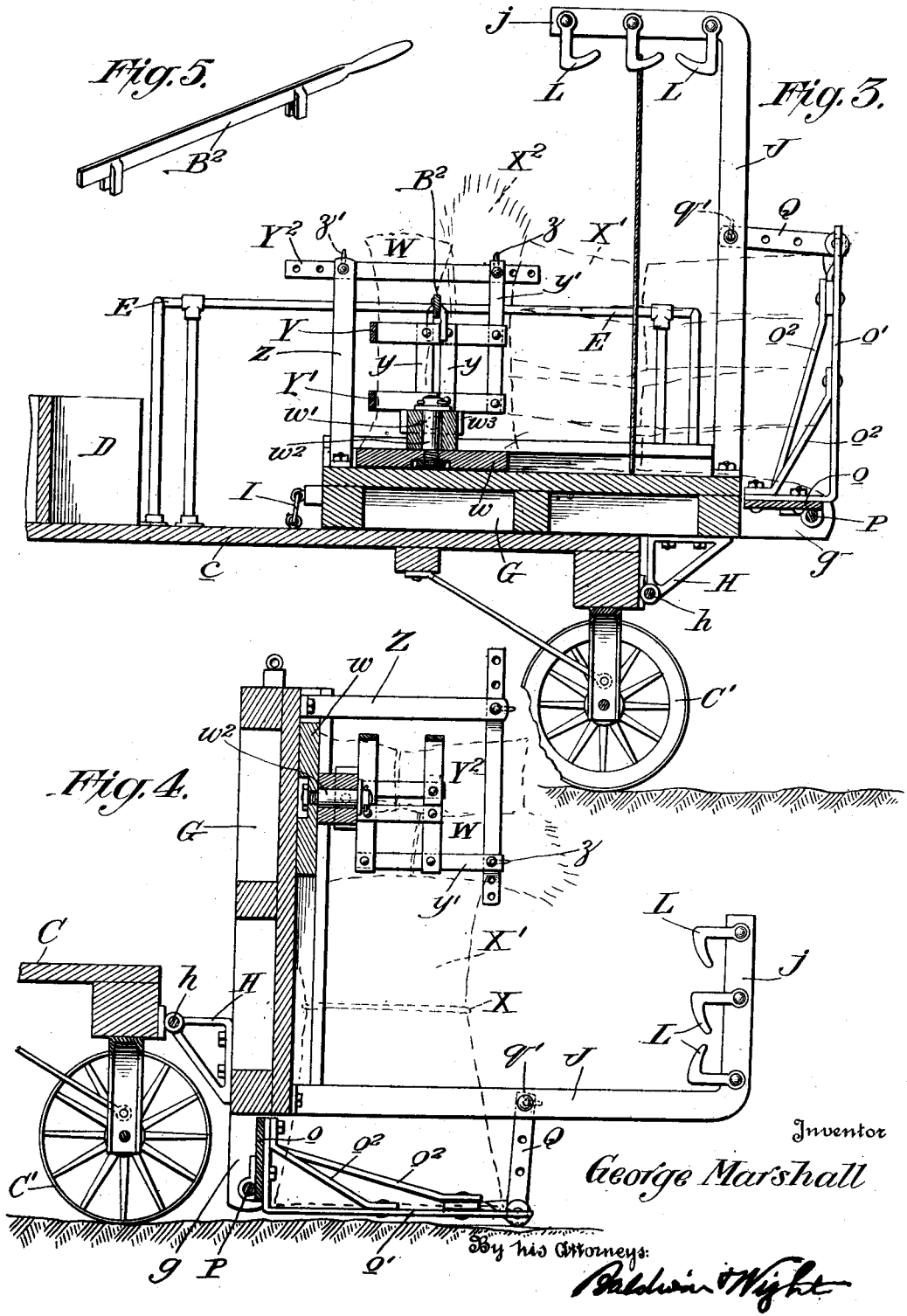

G. MARSHALL.
MACHINE FOR MAKING SHOCKS.
APPLICATION FILED NOV. 24, 1915.

1,176,585.

Patented Mar. 21, 1916.
5 SHEETS—SHEET 4.

Inventor
George Marshall.
By his Attorneys
Baldwin Wight

G. MARSHALL.
MACHINE FOR MAKING SHOCKS.
APPLICATION FILED NOV. 24, 1915.
1,176,585.
Patented Mar. 21, 1916.
5 SHEETS—SHEET 5.
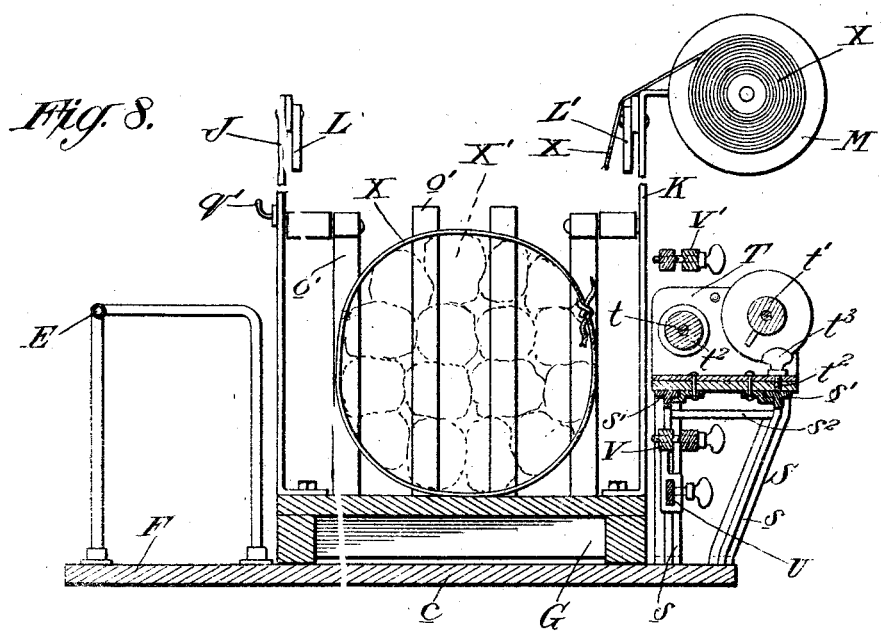
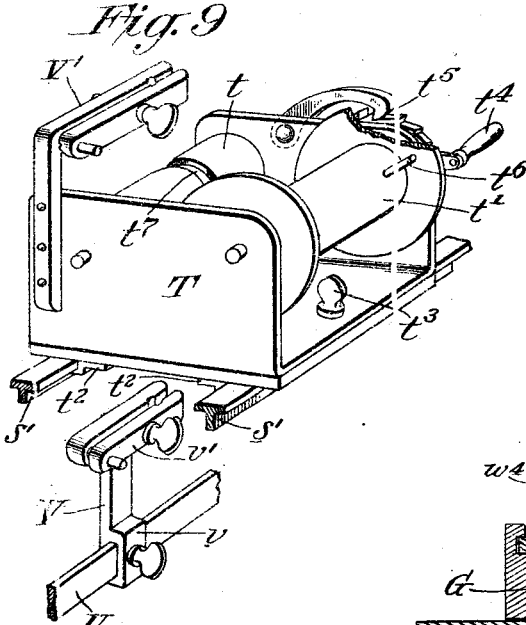
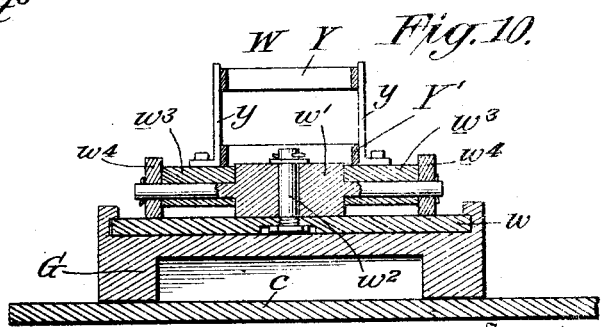
Inventor
George Marshall
By his Attorneys
Baldwin Wight

UNITED STATES PATENT OFFICE.

GEORGE MARSHALL, OF FREMONT, NEBRASKA.

MACHINE FOR MAKING SHOCKS.

1,176,585. Specification of Letters Patent. Patented Mar. 21, 1916.

Application filed November 24, 1915. Serial No. 63,299.

*To all whom it may concern:*

Be it known that I, GEORGE MARSHALL, a citizen of the United States, residing in Fremont, in the county of Dodge and State of Nebraska, have invented certain new and useful Improvements in Machines for Making Shocks, of which the following is a specification.

This invention relates to machines for making shocks of the kind shown in my former U. S. patents as follows: 937,454 of October 19, 1909; 1,000,533 of August 15, 1911; 1,025,705 of May 7, 1912; 1,073,917 of September 23, 1913. The machine shown in the three patents first mentioned, generally stated, comprises a wagon which travels abreast of the grain binding machine, receives sheaves of grain therefrom and is provided with upright posts between which the sheaves are piled in sufficient number to form a shock of the desired size. While thus piled the sheaves are compressed by a compressing rope, operated by a windlass connected with the wheels of the wagon. After the bundles are thus compressed they are secured tightly together by a binding rope and then the compressing rope is released. Afterward cap sheaves are applied, the shock is lowered to the ground, and the wagon is moved forward and leaves the shock in the field.

According to my present invention, I provide a wagon or truck which receives the sheaves from the binder and another truck to which the sheaves are transferred from the truck first mentioned and where they are formed into shocks by improved mechanism, the construction and operation of which are hereinafter explained. The two trucks travel along with the binder, the first-mentioned truck being connected with the binder in such manner as to be drawn by the same team that draws the binder while the second truck, or that in which the shocks are formed, is drawn by a special draft animal.

Figure 1:
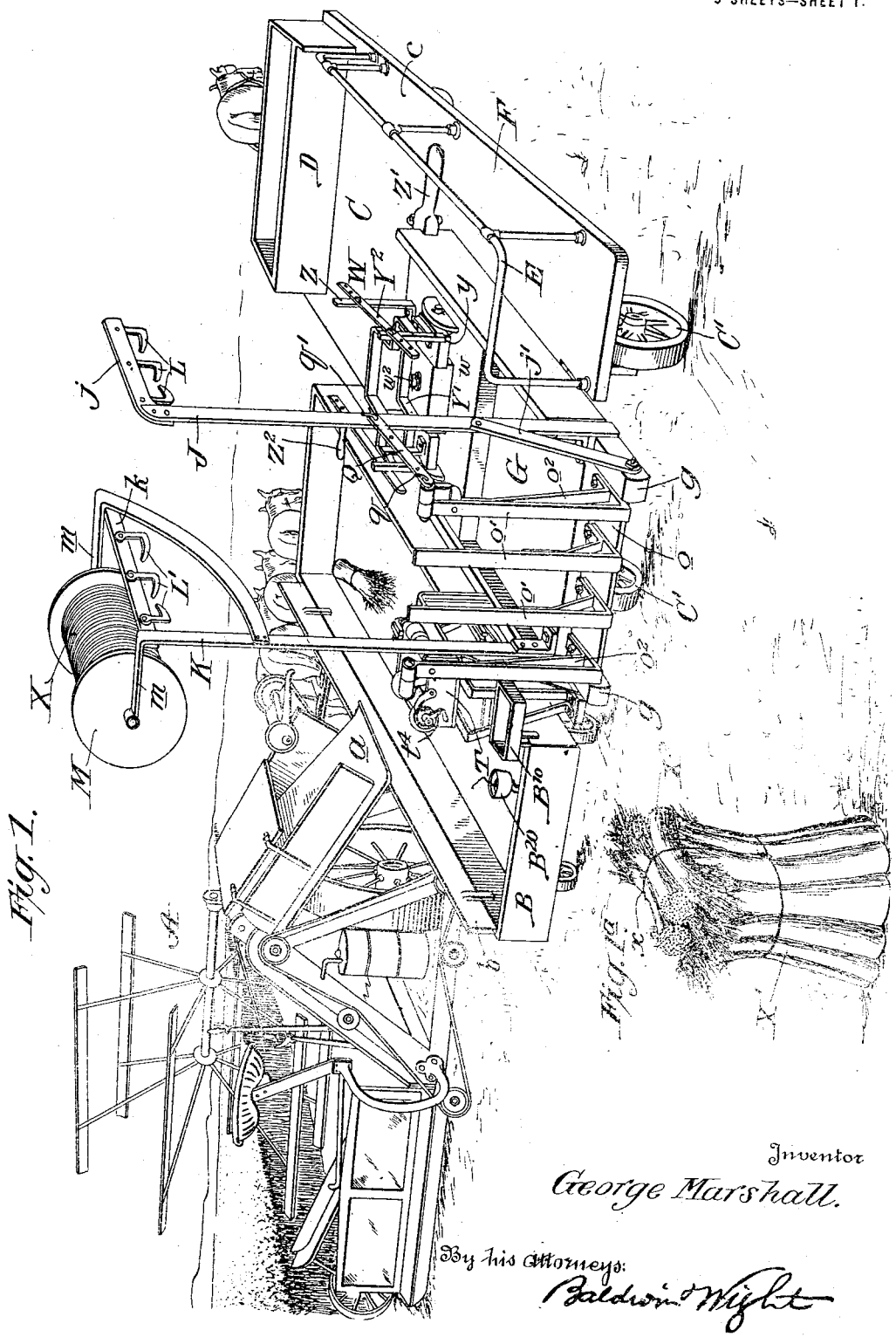
Figure 2:
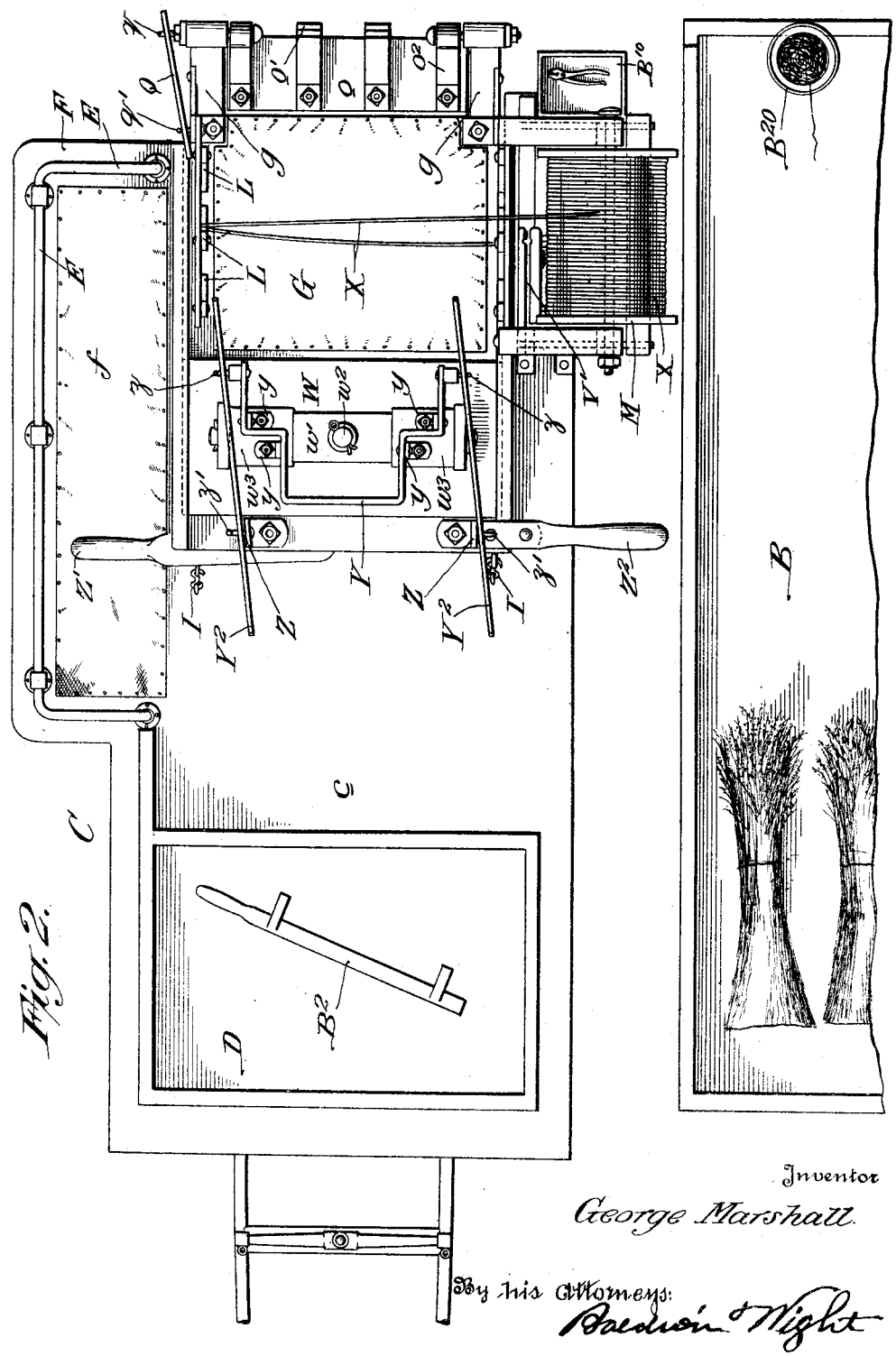
Figure 6:
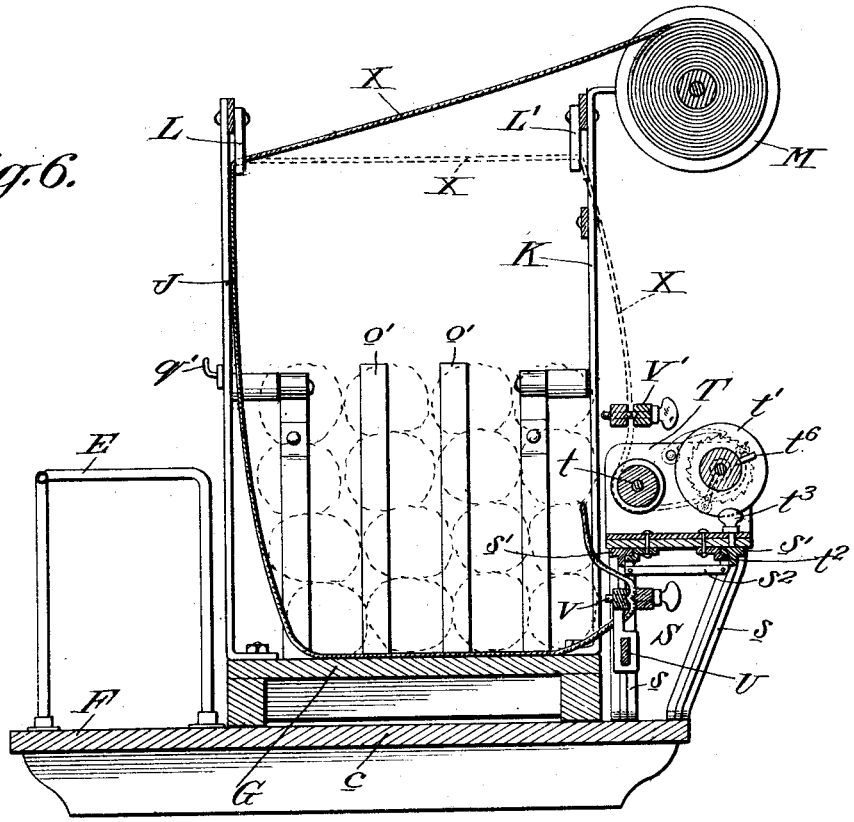
Figure 7:
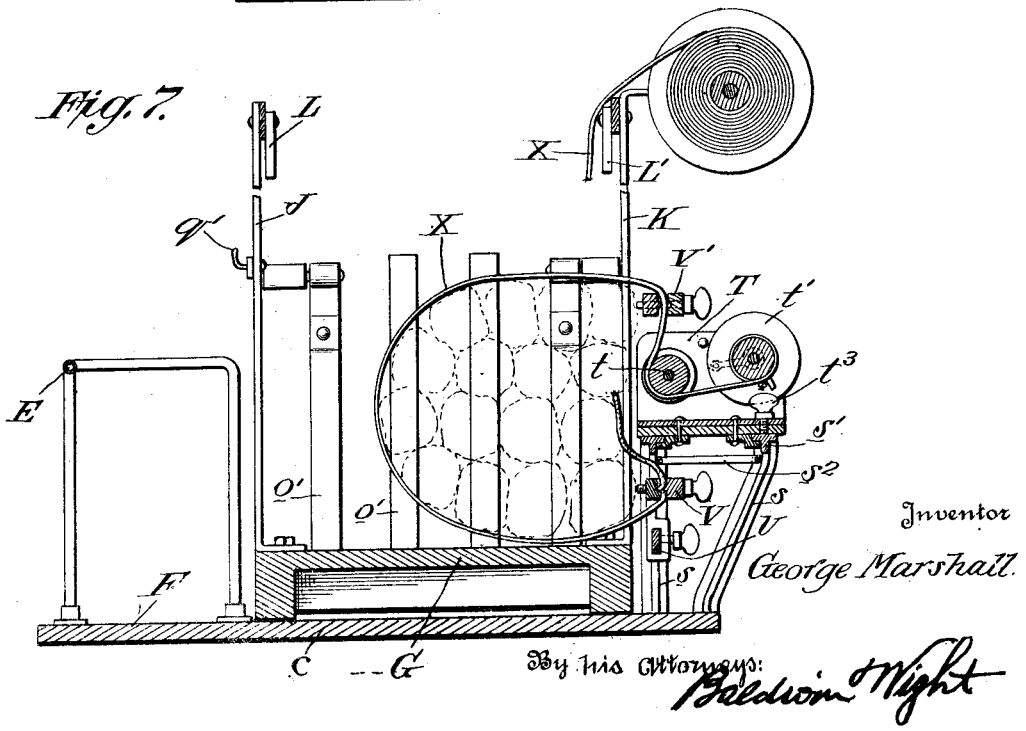

In the accompanying drawings:—Figure 1 is a perspective view, showing how the trucks constructed in accordance with my invention are associated with a grain binding machine in the field. Fig. 1ᵃ is a perspective view of a shock in rear of the machines. Fig. 2 is a plan view of the shock-forming truck and a portion of the intermediate truck. Fig. 3 shows a vertical section of the shock-forming truck with the mechanism in the position in which it is held while a shock is being formed. Fig. 4 is a similar section with the mechanism turned over to deposit a completed shock. Fig. 5 is a perspective view of a dividing bar employed in connection with the cap sheaf rack. Fig. 6 is a vertical section, showing particularly the mechanism employed for compressing the sheaves and forming the shock. This figure shows the condition of the mechanism before the sheaves are compressed. Fig. 7 is a view similar to Fig. 6 but showing the shock in its compressed condition. Fig. 8 is a view similar to Figs. 6 and 7, showing the completed shock with the binding cord separated from the clamps. Fig. 9 is a perspective view of the windlass employed for winding the compressing cord. Fig. 10 is a sectional view of the cap sheaf rack.

A indicates a grain-binding machine of well known type, B the intermediate or sheaf-receiving truck, and C the shock-forming truck.

The truck B is merely a wagon adapted to receive the sheaves of grain as fast as delivered by the binder. It may be provided with detachable side-boards $b$ for varying the height of its sides. Side-boards of different heights may be used so as to cause the side of the truck to conform to the elevation of the delivery part $a$ of the binder when set at different elevations. The truck B may be connected in any suitable way with the draft appliances of the binder so that the team which draws the binder may also draw the intermediate truck.

The shock-forming truck is of improved construction and embodies several features of novelty. The body $c$ may be of any suitable construction and may be supported by wheels C' of any suitable kind. The truck may be drawn by any suitable draft animal and should be kept abreast of the intermediate truck although a slight variation in the position of the trucks is not important. At its front end the truck body is provided with a box or receptacle D for tools and parts of mechanism and it has a railing E surrounding a platform F on which an attendant stands. The platform may be covered with any suitable material $f$ to prevent the attendant from slipping while at work.

G indicates a tilting platform which normally bears on the body $c$ of the truck (Fig. 3) and carries at its rear end brackets H which are hinged at $h$ to the rear end of the truck body. Normally the platform is held in horizontal position on the truck body by hooks I or other suitable fastening devices, but when these are released the platform may be tilted or moved over to the position shown in Fig. 4.

The side beams $g$ of the platform project rearwardly from the middle portions thereof and carry uprights J, K, one of which J, is provided at its upper end with a laterally extending arm $j$ carrying a number of hooks L, while the other upright, K, carries a laterally projecting arm $k$ provided with a number of hooks L' and also with a frame $m$ carrying a spool M on which the compressing and binding cord X is wound. The upright J is suitably braced at $j'$ and the upright K may be similarly braced.

Between the rearwardly projecting ends of the beams $g$ is mounted an end frame comprising a horizontal base-piece $o$ and uprights $o'$ which are suitably braced, as shown, at $o^2$. The base-piece $o$ is pivotally connected with the beams $g$, as indicated at P, in such manner that the end frame may be set at different angles. The end frame is held in place by a strap Q, engaging hooks $q$, $q'$ on the end frame and on the upright J. It will be observed that the strap Q is provided with a number of holes which permit of the end frame being held at different inclinations or straps of different lengths may be employed. It will be understood that the end frame when elevated is adjusted to different inclinations by means of the link Q so that the base or bottom of the shock may be given the desired slant or slope to correspond with the ground on which it is deposited when on a level or when going up-hill or down-hill.

Mounted on the truck body $c$ next the intermediate truck B is a frame S comprising upright brackets $s$, horizontal top pieces $s'$ and end pieces $s^2$. This frame supports a sliding frame T in which is mounted a roller $t$ and a windlass $t'$. The frame is provided on its under-side with slide rails $t^2$ (Fig. 9), fitting the top pieces or rails $s'$ of the frame S, and the arrangement is such that the frame T may be moved back and forth on the frame S and set in its adjusted position by suitable means such as a set screw $t^3$. The windlass may be operated by a crank $t^4$ and it is provided with suitable ratchet detent mechanism $t^5$ of well known construction.

U indicates a horizontal frame member attached to the brackets $s$. This carries a clamp V comprising a part $v$ adjustably mounted on the frame member U and a part $v'$ which is the clamp proper and it comprises two members adapted to receive and hold the compressing and binding cord X. Another similar clamp V' is attached to the frame T (Fig. 9). This clamp is also adapted to receive and hold the binding and compressing cord X, as will be hereinafter explained.

A cap sheaf rack W is mounted on the platform G in such manner as to slide fore and aft thereon, the base $w$ being suitably guided in the manner indicated in Figs. 3 and 4. A block $w'$ is pivoted at $w^2$ to the base $w$ in such manner as to turn about a vertical axis and to the opposite ends of the block $w'$ are pivoted other blocks $w^3$ which are also pivoted to brackets $w^4$ attached to the base-board $w$. The arrangement is such that the blocks $w^3$ may turn about a horizontal axis and may also turn about a vertical axis relatively to the base $w$. The blocks $w^3$ support, by means of uprights $y$, frame bars Y, Y' which are so formed, as indicated most clearly in Fig. 2, as to provide a relatively wide rear portion and a narrower front portion and these two portions are adapted to receive sheaves used in constructing the cap of the shock. Uprights $y'$ are attached to the rear ends of the frame pieces Y, Y' and these uprights are provided with hooks $z$. In front of the cap sheaf rack standards Z are attached to the platform G and these are provided with hooks $z'$. The hooks $z$ and $z'$ are adapted to receive the straps or bars Y$^2$ which connect the uprights $y'$ and Z in the manner clearly shown in the drawings. The straps Y$^2$ have a series of holes at each end, as indicated. The arrangement is such that the frame bars Y, Y' may be set at any desired inclination. That is to say, by turning the blocks $w^3$ on their pivots the frame Y, Y' may be set at the desired inclination and then held by the straps or bars Y$^2$. It is also plain that the frame or rack as a whole may be turned about its vertical axis and held at the desired inclination, the straps Y$^2$ being suitably adjusted to hold the rack at any desired angle. A handle Z' is secured to the platform G and another handle Z$^2$ is attached to one of the uprights Z in order that after the fastening devices I are released an attendant on the platform F and one in the intermediate truck B may take hold of the handles and elevate the front end of the platform, causing it to turn over to the position shown in Fig. 4. The device marked B$^2$ in Fig. 5 is employed in connection with the cap sheaf rack during the process of constructing the cap for the shock in the manner hereinafter described.

The bound sheaves from the binder A are delivered to the intermediate truck B in the manner indicated in Fig. 1. An attendant on the truck B passes the sheaves therefrom to the truck C where they are piled on the platform G in the manner shown. Before this, however, the rear end frame $o'$ is set either vertically or inclined to correspond with the condition of the field whether level, up-hill or down-hill, and the compressing and binding twine is suitably laid, in the manner indicated in Fig. 6. That is to say, the twine is taken from the reel M, passed over a hook L, and then down to and across the platform G. The end of the twine is then clamped at V. After a suitable length of twine is unwound it is cut and passed through the upper clamp V' and then extended through the groove $t^7$ in the roller $t$ and firmly attached to the pin $t^6$ on the windlass $t'$, all as indicated in Fig. 6. When this is done or preferably before the twine is cut the sheaves are piled on the platform G in a sufficient number to form a shock of the desired size. The sheaves are so laid that the butt ends rest against the rear end frame $o'$ which is set at the proper angle or inclination. At this time the cap sheaf rack is set at the proper position to bring the grain end of the sheaves close to the rack. When the sheaves are thus arranged the lower clamp V is held tight while the upper clamp V' is loosened and the windlass is operated to tighten the twine and compress the bundle, in the manner indicated in Fig. 7. Then the upper clamp V' is tightened and the upper end of the twine is released from the windlass and the loose ends of the twine are tightly secured together. The clamps are then loosened and the twine is separated from them, thus releasing the shock which will then be in the condition indicated in Fig. 8, and may be moved by the attendants to the central portion of the platform. The shock is then in condition to receive the cap sheaves $X^2$ and these are formed into a cap in the cap-sheaf rack W. The dividing bar $B^2$ is first placed on the rack in the manner indicated. A suitable number of sheaves, say three, is placed in the wide portion of the rack behind the dividing bar $B^2$ and additional sheaves, say two, are placed in the narrower portion of the rack in front of the dividing bar $B^2$. This completes the shock X' and it is dropped in the field by turning over the platform G, in the manner indicated in Fig. 4.

The cap sheaves are attached to the shock by means of a cord $x$ as indicated in Fig. 1$^a$. This may be done before the shocks are dumped or afterward. If it is done before the dumping twine may be drawn from the receptacle $B^{20}$, cut into suitable lengths and applied while the sheaves are in the condition shown in Fig. 3, the bar $B^2$ having been previously removed. But it is also practicable to arrange the cap sheaves in the manner indicated in Fig. 3, then dump as shown in Fig. 4 and afterward tie the cap sheaves in place while the shocks are standing in the field as indicated in Fig. 1$^a$.

It is of course understood that the grain is of varying height and cut to varying lengths and the mechanism of my shock former is adapted to accommodate these variations. The cap sheaf rack may be moved fore and aft to the proper extent to bring the cap sheaves a proper distance from the rear end frame and close to the shock X'. The windlass-supporting frame T may be moved fore and aft and set at the proper position to hold the windlass and clamps in proper line with the middle portions of the sheaves and the twine may be passed over suitable hooks L, L' to guide the twine properly to the sheaves whatever their lengths. As I have already stated the rear end frame $o'$ may be set at the proper angle to cause the butt ends of the sheaves to conform to the slope of the ground and the rack W may be tilted on its horizontal axis for a similar purpose. When working on the side of a hill the attendant should properly arrange the sheaves while the shock is being formed and the rack W may be adjusted about its vertical axis to cause the cap sheaves to conform to the inclination of the sheaves in the shock.

Experience has demonstrated that in my machine all the necessary adjustments are provided for all usual conditions. The different parts of the machine may be very quickly and easily adjusted to accommodate varying conditions and the sheaves as fast as delivered by the binder may be received by the intermediate truck from which they may be transferred to the shock-forming truck. In case the sheaves are delivered more rapidly than they can be handled in the shock-forming truck they may be stored in the intermediate truck, but it is my purpose to form all the sheaves into shocks during the process of cutting the grain and not to leave loose sheaves in the field.

I claim as my invention:

1. A shock forming truck, comprising a truck body, a platform hinged near its rear end to the rear end of the truck body, a rear end frame hinged to said platform, means for adjusting the inclination of the rear end frame relatively to said platform, and a cap sheaf rack mounted on the front end of the platform and adapted to move thereon about both vertical and horizontal axes.

2. A shock forming truck, comprising a truck body, a platform hinged at its rear portion to the end of the truck body and normally resting on the truck body, means for fastening the platform to the truck body at its front end, a rear end frame hinged to the rear portion of said platform, and means for adjusting the inclination of the rear end frame.

3. A shock-forming truck, comprising a truck body, a platform hinged to the rear end of the truck body, and a cap sheaf rack supported by the platform and adapted to move thereon about both vertical and horizontal axes.

4. A shock-forming truck comprising a truck body, a tilting platform hinged to the rear end of the truck body, a rear end frame hinged to the rear end of the platform, and a cap sheaf rack adjustable longitudinally on the platform and adapted to move thereon about both vertical and horizontal axes.

5. A shock-forming truck comprising a truck body, a tilting platform mounted thereon, and a cap sheaf rack adjustable longitudinally on the platform and comprising a base-board, a block pivotally connected with the base-board to move about a vertical axis, other blocks having a pivotal connection with said first-mentioned block and adapted to move about a horizontal axis, and a rack supported by said blocks.

6. The combination with the tilting platform of a shock-forming truck of a cap sheaf rack, comprising a base-board adjustable longitudinally of the platform, a rack supported on the base-board and adapted to move about both a vertical and a horizontal axis, and means for holding the rack in its adjusted position.

7. A shock forming truck, comprising a truck body, a tilting platform hinged thereto to which the sheaves are delivered, uprights attached to the platform near its rear end, a twine-carrying spool mounted on said standards, guides for the twine also carried by said standards, a windlass mounted on the truck body, and clamps for holding the ends of the twine used to bind a bundle of sheaves arranged both above and below the plane of the windlass.

8. In a shock forming truck, the combination with the truck body, of a tilting platform on which the sheaves are piled, a windlass, a windlass-supporting frame, a frame mounted on the truck body which supports the windlass-supporting frame, means for adjusting the windlass-supporting frame fore and aft on the truck body, and clamps adjustable fore and aft of the machine and carried by said frame for holding the ends of the twine employed for compressing and binding a bundle of sheaves.

In testimony whereof, I have hereunto subscribed my name.

GEORGE MARSHALL.

Witnesses:
S. S. SIDNER,
JESSIE M. GAGE.

Copies of this patent may be obtained for five cents each, by addressing the "Commissioner of Patents. Washington, D. C."